(12) United States Patent
Nair

(10) Patent No.: US 9,729,615 B2
(45) Date of Patent: Aug. 8, 2017

(54) SYSTEM AND METHOD FOR COLLABORATIVE DESIGNING, DEVELOPMENT, DEPLOYMENT, EXECUTION, MONITORING AND MAINTENANCE OF ENTERPRISE APPLICATIONS

(71) Applicant: NUWAFIN HOLDINGS LTD, Al-Qusais (UA)

(72) Inventor: Nandakumar Krishnan Nair, Dubai (UA)

(73) Assignee: NUWAFIN HOLDINGS LTD, Al-Quasais, Dubai (*) Notice: Subject to any disclaimer, the term of this patent is extended or adjusted under 35 U.S.C. 154(b) by 444 days.

(21) Appl. No.: 14/082,213

(22) Filed: Nov. 18, 2013

(65) Prior Publication Data
US 2015/0142949 A1 May 21, 2015

(51) Int. Cl.
*G06F 15/173* (2006.01)
*H04L 29/08* (2006.01)
*H04L 12/24* (2006.01)
*H04L 12/26* (2006.01)

(52) U.S. Cl.
CPC .......... *H04L 67/10* (2013.01); *H04L 67/2842* (2013.01); *H04L 41/0893* (2013.01); *H04L 41/5038* (2013.01); *H04L 43/0817* (2013.01); *H04L 67/2823* (2013.01)

(58) Field of Classification Search
CPC ..... H04L 29/08; H04L 67/10; H04L 67/2842; H04L 41/0893; H04L 41/5038; H04L 43/0817; H04L 67/2823

USPC ........................................................ 709/224
See application file for complete search history.

(56) References Cited

U.S. PATENT DOCUMENTS

| 6,473,794 | B1 * | 10/2002 | Guheen ................... H04L 41/22 709/223 |
| 8,392,566 | B1 * | 3/2013 | Salle ...................... G06F 9/5055 705/26.8 |
| 2002/0049749 | A1 * | 4/2002 | Helgeson ................ G06F 9/468 709/203 |
| 2002/0059425 | A1 * | 5/2002 | Belfiore ................... G06F 9/54 709/226 |

(Continued)

*Primary Examiner* — Philip Chea
*Assistant Examiner* — Wing Ma
(74) *Attorney, Agent, or Firm* — Barry Choobin; Patent 360 LLC

(57) ABSTRACT

The various embodiments herein provide a system and method for providing collaborative designing, development, deployment, execution, monitoring and maintenance of an enterprise application. The system comprises a distributed cache shared across a plurality of nodes to form a cluster of nodes, a cluster manager to implement one or more clustering strategies, a load balancer to distribute a load across the nodes in the cluster, a data access layer to connect to a plurality of data stores using one or more persistent store adaptors, a data management layer to provide access to business data and meta-data, a processing engine to support Online Transaction Processing (OLTP), a service container for generating business services by wiring platform services with business rules and an Enterprise Application Designer to build the enterprise applications by wiring platform services as business services using the business rules.

3 Claims, 5 Drawing Sheets

(56) References Cited

U.S. PATENT DOCUMENTS

| | | | | |
|---|---|---|---|---|
| 2004/0187140 | A1* | 9/2004 | Aigner | G06F 8/20 719/328 |
| 2006/0064481 | A1* | 3/2006 | Baron | H04L 41/0886 709/224 |
| 2009/0158246 | A1* | 6/2009 | Sifter | G06F 9/466 717/105 |
| 2009/0322151 | A1* | 12/2009 | Ferlitsch | H02J 3/14 307/39 |
| 2010/0011102 | A1* | 1/2010 | Dasgupta | G06F 9/5066 709/226 |
| 2010/0262559 | A1* | 10/2010 | Wilcock | G06Q 10/067 705/348 |
| 2011/0125895 | A1* | 5/2011 | Anderson | H04L 9/3213 709/224 |
| 2011/0179165 | A1* | 7/2011 | Ravichandran | G06Q 10/06 709/224 |
| 2012/0066670 | A1* | 3/2012 | Mccarthy | H04L 41/0806 717/169 |
| 2012/0159446 | A1* | 6/2012 | Jentsch | G06F 9/44 717/124 |
| 2012/0185821 | A1* | 7/2012 | Yaseen | G06F 8/10 717/105 |
| 2012/0324069 | A1* | 12/2012 | Nori | G06F 9/5066 709/222 |
| 2013/0144951 | A1* | 6/2013 | Viswanath | H04L 29/08 709/204 |
| 2014/0075032 | A1* | 3/2014 | Vasudevan | G06F 9/5072 709/226 |
| 2015/0052095 | A1* | 2/2015 | Yang | G06F 8/10 706/47 |

* cited by examiner

SYSTEM AND METHOD FOR COLLABORATIVE DESIGNING, DEVELOPMENT, DEPLOYMENT, EXECUTION, MONITORING AND MAINTENANCE OF ENTERPRISE APPLICATIONS

BACKGROUND

Technical Field

The embodiments herein generally relate to a cloud based business environment and particularly relates to a web-based platform for design and development of enterprise applications. The embodiments herein more particularly relates to a method and system for deploying, executing, monitoring and maintaining enterprise applications in the cloud-enabled production environment.

Description of the Related Art

Various enterprise applications fundamentally differ only in their business entities, business processes, context and business rules. The underlying technical layer does not vary across the applications. If the enterprise layer is isolated from the technical layer, then an underlying technical layer can be constructed in a re-usable manner.

There are multiple system software layers that have evolved over many years on top of the hardware layer to make application development flexible and easier such as database engines, application servers, web servers and the like. With the advent of the Service-oriented architecture (SOA) framework, external systems and users interact only with the service layer. The workings of the underlying technical layers are hidden successfully using abstraction.

In a rapidly changing high technology business environment where information management of the business organization is often a critical factor in maintaining competitiveness, it has become increasingly necessary for businesses to adopt software business platforms in an effort to enable the efficient sharing of information. Additionally, many enterprises do not want the hassle of maintaining their own server hardware. Provided that their security concerns have been addressed, enterprises prefers to outsource the hardware management to the cloud and simply use the enterprise application to meet their business needs.

In view of the foregoing, there exists a need for an Integrated Development Environment (IDE) for developing business applications. There also exists the need for a web-based deployment environment that integrates underlying technical layers, thereby allowing enterprise architects to focus on building the business functionality using business services easily. Further, there is a need for a method and system for defining the business rules and the rules of entity relationships, deploying these applications on the application development platform, monitoring their usage and maintaining the same.

The abovementioned shortcomings, disadvantages and problems are addressed herein and which will be understood by reading and studying the following specification.

SUMMARY

The primary object of the embodiments herein is to provide a collaborative platform for generating enterprise applications in conjunction with the business requirements.

Another object of the embodiments herein is to provide a method and system for generating enterprise applications based on functional and non-functional business requirements.

Another object of the embodiments herein is to provide a collaborative platform for developing, deploying, monitoring and maintaining the enterprise applications in the cloud based business environment Yet another object of the embodiments herein is to provide a method and system for making the application development platform highly flexible and collaborative for enabling the enterprises to build applications tailored to their specific needs.

Missing Item: These and other objects and advantages of the present embodiments will become readily apparent from the following detailed description taken in conjunction with the accompanying drawings.

The various embodiments herein provide a system for enabling collaborative designing, development, deployment, execution, monitoring and maintenance of an enterprise application. The system comprises a distributed cache shared across a plurality of nodes to form a cluster of nodes, a cluster manager to implement one or more clustering strategies, a load balancer to distribute a load across the nodes in the cluster, a data access layer to connect to a plurality of data stores using one or more persistent store adaptors, a data management layer to provide access to business data and meta-data, a processing engine to support Online Transaction Processing (OLTP), a service container for generating business services by wiring platform services with business rules, and an Enterprise Application Designer to build the enterprise applications by wiring platform services as business services using rules.

According to an embodiment herein, the system is a real-time execution engine adapted for combining ETL, Event Processing, Rule Processing, Online Transaction Processing (OLTP), Online Analytical Processing (OLAP), Master Data Management, Business Process management and Dynamic User interface management for a plurality of user devices.

According to an embodiment herein, the service container comprises a session manager, a plurality of application protocols for providing application security and transport security, a license manager, a regulatory compliance manager, a policy manager, an SLA manager and a service directory.

According to an embodiment herein, the processing engine comprises an Analytical Engine to support OLAP operations, an Execution Engine for rule processing an Event Framework for event processing, a resource manager, a thread manager, a memory manager and a context manager.

According to an embodiment herein, the system further comprises a transaction manager for coordinating transactions across one or more resources, a lifecycle manager for managing the life of an application through governance, development and maintenance, a performance analyzer, a debugger and a monitor and a business user interface adapted to run on a plurality of user devices having different form factors to support internationalization.

According to an embodiment herein, the data access layer is adapted to support caching and transaction management.

According to an embodiment herein, the data store comprises at least one of RDBMS, column oriented, graph, file systems. No SQL databases and a cloud based data store.

According to an embodiment herein, the data management layer is further adapted to validate business data, provide data security, support data backup and data recovery, support a plurality of attribute types, business entities and entity relationships, support versioning and maintain audit history.

According to an embodiment herein, the business applications are built based on the business rules, the platform services and the relationship between the platform services and the business rules.

According to an embodiment herein, the cluster manager is adapted to provide for energy conservation by switching OFF one or more hardware nodes during off peak hours with minimal load and switching ON the hardware nodes when the load increases.

According to an embodiment herein, the enterprise application designer builds enterprise applications through at least one of Business Process Model and Notation (BPMN), service composition, GUI modeling, data entity modeling and other visual modeling editors.

According to an embodiment herein, the enterprise application designer is further adapted to provide a platform for non-technical users for collaborative designing, development, execution, deployment, monitoring and maintenance of the enterprise application without a need for coding. The enterprise application designer also provides for maintaining end-to-end traceability between user requirements, configured artifacts, one or more test cases and the pass/fails status of the test cases.

According to an embodiment herein, the service container generates business services using metadata provided through an authoring interface of the Enterprise Application Designer. The service container interfaces the business services to external applications through at least one of SOAP, JSON and REST.

According to an embodiment herein, the system further comprises an application knowledge base adapted to store the knowledge related to building business entities, attributes related to the entities, relationship between entities and associated processing rules, enhance speed of application development by assisting an application builder in providing standard application templates for various industries, pre-defined entities for various applications with pre-defined attributes and rules.

The knowledge base also tracks performance of business and platform services in production, maintain history of expected performance of different platform services and hold information on performance benchmarks of various platform services and rule engine operations. The performance benchmark information is adapted for predicting the expected performance of the platform service by adding up the performance of one or more constituent platform services and notifying administrators if the actual performance of the platform services in the production system is different from the expected performance.

According to an embodiment herein, the system is adapted to be deployed on at least one of a cloud environment and a hardware appliance hosted within an enterprise to expose the platform services for building the enterprise application using an SOA framework.

Embodiments herein further provide a method for collaborative designing development, deployment, execution, monitoring and maintenance of an enterprise application. The method comprises capturing one or more requirements for the enterprise application, providing traceability for the captured requirements by an enterprise application designer, identifying artifacts associated with each of the captured requirement, capturing one or more processes involved in the enterprise applications and implementing one or more business process by composing business services through wiring a plurality of platform services with business rules, modeling one or more business entities and one or more events related to the business entities with their attributes and relationships, inheritance rules, validation rules and derivation rules, modeling a graphical user interface based on a user device type and form factor, deploying metadata of the enterprise application and generating the user interface and the business services.

According to an embodiment herein, the method further comprises monitoring of the deployed applications for errors and warnings, providing information on performance of a plurality of platform services and business services, informing the users on the expected performance of business services and refining execution logic of the deployed business services to enhance performance of the business services.

According to an embodiment herein, the collaborative platform comprises a plurality of pre-built products for various industries and verticals already configured. The business user can select one such product and make the modifications necessary to customize the product into a solution in accordance with the organization needs. During this process, the flexibility, scalability and functionality of the application is modified (i.e.) to make the product more flexible and offer a wider range of functionalities. Similarly, the solution offers only the functionalities needed by the organization with increased scalability.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present embodiments are shown in some drawings and not in others. This is done for convenience only as each feature may be combined with any or all of the other features in accordance with the present embodiments.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
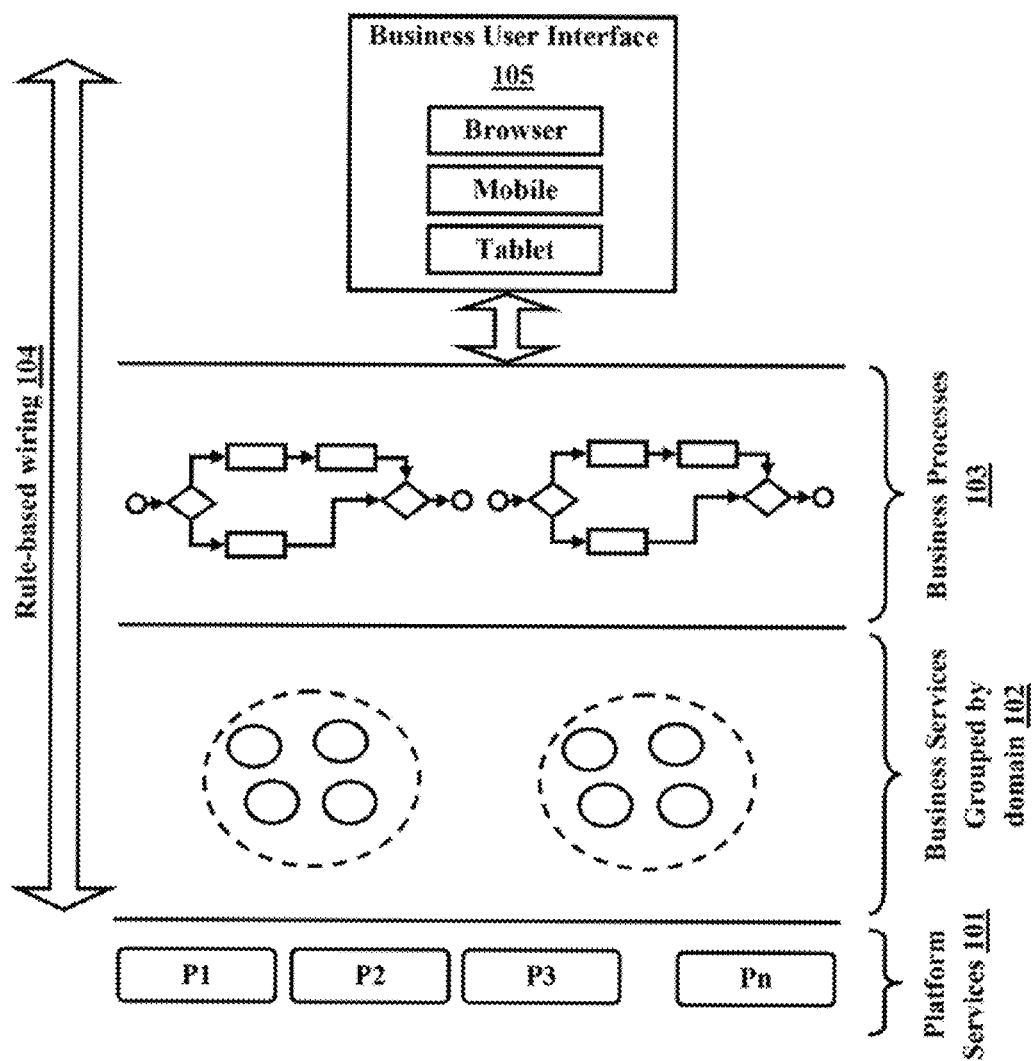
FIG. 1 is a block diagram illustrating a process for building enterprise applications by wiring platform services using business rules, according to an embodiment of the present disclosure.

FIG. 1 is a block diagram illustrating a process for building enterprise applications by wiring platform services using business rules, according to an embodiment of the present disclosure. The collaborative platform for building enterprise applications herein is a real-time execution engine combining ETL, Event Processing, Rule Processing, Online Transaction Processing (OLTP), Online Analytical Processing (OLAP), Master Data Management, Business Process management and Dynamic User interface management for a plurality of end users such as web, mobile devices, tablets and the like the functionalities of the platform as exposed as platform services (P1, P2, . . . Pn) 101 using a SOA framework.

The platform enables the business users to build enterprise applications by wiring a plurality of platform services (P1, P2, . . . Pn) 101 using business rules to create the business services 102 and business processes 103 of the enterprise application. The business services 102 are offered to plurality of users through an associated business user interface (UI) 105. The business UI 105 is configured using UI templates. These business UIs 105 are configured to be executed on different client devices such as mobile, tablets, having different form factors and to support internationalization. The business UI 105 provides a plurality of business related services 102 to the business users. The business users are able to author new services by wiring business services 102 with business rules. Further, the plurality of business services 102 which are developed in the cloud are grouped under a respective field or domain for easing the search and usage by the business users. The business services 102 are shown inside dash circles. The business processes 103 define a set of steps or tasks for a specific business service. The business processes 103 are illustrated through a plurality of flow charts comprising q plurality of decision boxes, connectors, processes, etc. Then, pluralities of platform based services 101 P1, P2, P3, Pn are offered to the business users on the cloud. The platform services facilitate the deployment of business applications without the additional cost and burden of buying and handling the necessary hardware and software and facilitating hosting capabilities. Here the business processes 103 are implemented by composing business services through a rule based wiring 104 of platform services with business rules.

Figure 2:
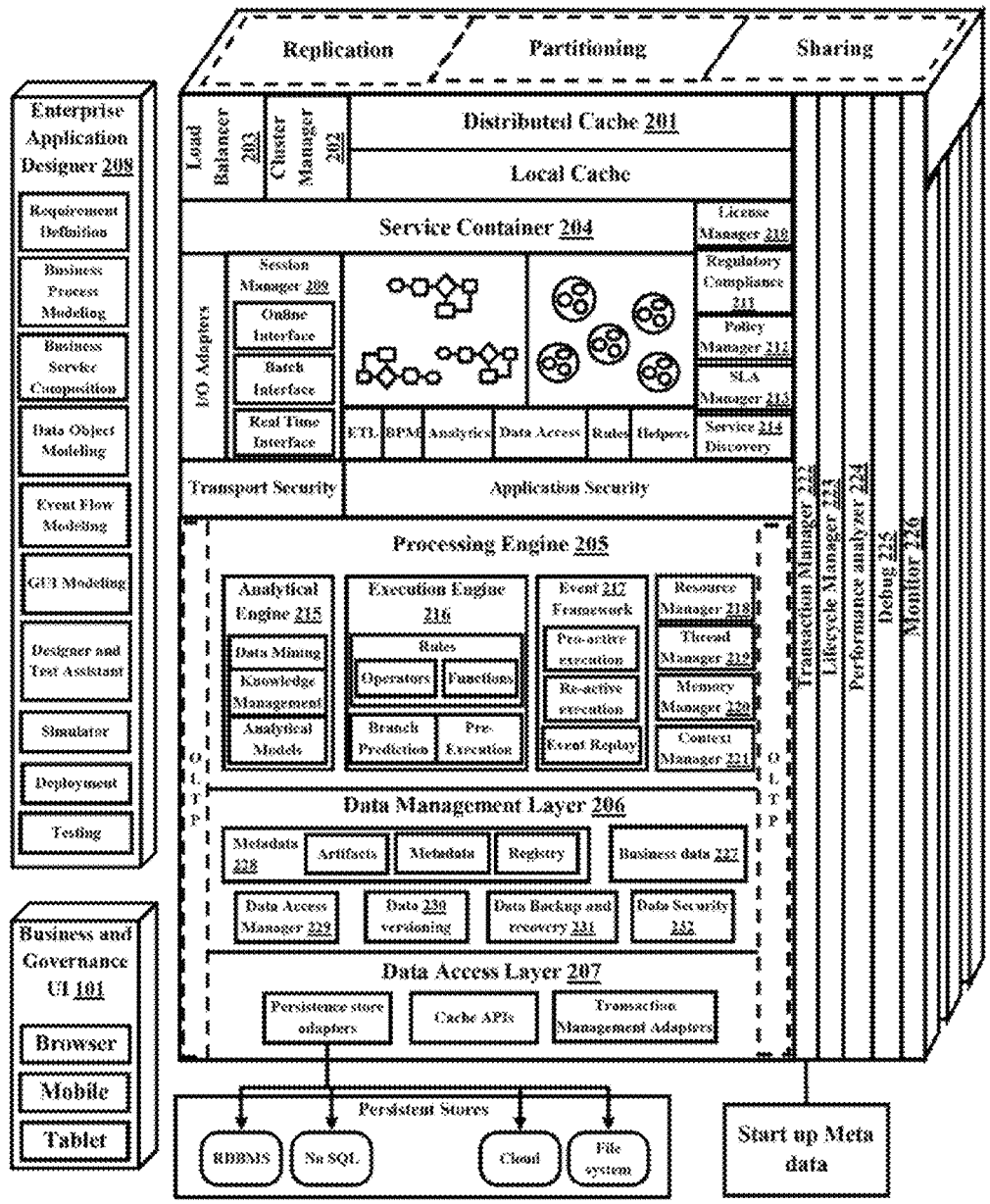
FIG. 2 illustrates a functional block diagram for a high level architecture of the web based application development platform, according to an embodiment of the present disclosure.

FIG. 2 illustrates a functional block diagram for a high level architecture of the web based application development platform, according to an embodiment of the present disclosure. The application development platform comprises a plurality of nodes forming a cluster of nodes, a distributed cache shared across the plurality of nodes, a cluster manager, a load balancer, a data access layer, a data management layer, a processing engine to support Online Transaction Processing (OLTP), a service container for generating business services by wiring platform services with business rules and an Enterprise Application Designer to build the enterprise applications by wiring platform services as business services using rules.

The application development platform is deployed the plurality of nodes. The distributed cache 201 is shared across the nodes, forming clusters of nodes. A cluster manger 202 is further provided in the platform to implement different clustering strategies to improve performance and availability. The load balancer 203 is used to distribute the load across the plurality of nodes in the cluster. The cluster manager 202 and the load-balancer 203 are used in conjunction to implement a 'Go Green' strategy. During off peak hours with minimal load, the cluster manager 202 switches OFF the predetermined hardware nodes to save energy and the load balancer 203 reroute all the traffic to the nodes which are ON. When the load increases, the cluster manager 202 brings back these nodes to ON state and these nodes can then be utilized by the load balancer 203.

The data access layer 207 is adapted to connect to different types of persistent data stores such as Relational Database Management System (RDBMS), column oriented, graph, file systems. No SQL, databases, cloud, etc using different persistent store adaptors. The data stores are also deployable on the cloud. The data access layer 20 layer also supports caching of the Application Programming Interface (APIs) and transaction management. The transaction management is performed through one or more transaction management adapters. The data management layer 206 runs on top of the data access layer 207 and provides access to the business data 22 and the meta-data 228 associated with the business data. The metadata 228 comprises artifacts, registry, etc. The data management layer 206 validates the business data 227, provides data security 232 and supports the data backup and recovery 231 operations. Also, the data access manager 229 manages the access of data from the business users to the data stores and a data versioning module 230 keeps track of the latest and updated information in the data store.

The processing engine 205 provided in the enterprise application development platform is an event-driven rule chain execution engine to support Online Transaction Processing (OLTP). When a business rule is added to the platform, an invocation chain and rule object for that rule is constructed. When the corresponding event for that rule chain (invoking a business service or a business process etc) is triggered, the processing engine 205 executes the associated rule chain. The processing engine 205 also comprises an analytical engine 215 to support Online Analytical Processing (OLAP) operations. The analytical engine 215 performs data mining, knowledge management and builds analytical models during the operation. Further, the processing engine 205 comprises an execution engine 216, an event framework 217, a resource manager 218, a thread manager 219, a memory manager 220 and a context manager 221. The execution engine 216 assists the processing engine 205 for processing the data using rules comprising operators, functions, etc. The execution engine 216 uses branch prediction process for achieving efficient, fast and optimal results. The execution engine 216 also performs pre-execution steps to make the execution process faster. The event framework 217 prepares task specific events and provides operations such as pro-active execution, re-active execution, etc. The event framework 217 also provides an event replay option for verifying the workflow.

The resource manager 218 handles the optimal usage of resources for the development of enterprise applications. The thread manager 219 to manage the number of threads which are created to perform one or more tasks, which are usually organized in a queue. The memory manager 220 manages the required memory for storing the data related to the applications, providing free space during necessary conditions, etc. The context manager 221 provides solution relating to understanding of data at different files and data stores.

The Service Container 204 is adapted to host platform services and exposes the services platform services. The one or more business users are allowed to author new business services by wiring platform services with business rules. The service container 204 comprises a session manager 209, a license manager 210, a regulatory compliance 211, policy manager 212, SLA manager 213, and a service discovery 214. The session manager 209 provides transport security for data through online interfaces, batch interfaces and real time interfaces. The license manager 210 handles the distribution of the enterprise application among the plurality of business users. The service container 204 operates as per the defined regulatory compliance 211. The service container 204 also performs service discovery 214 operations for searching for devices on a network for providing services. Further, the service container 204 adopts policy manager 212 and SLA manager 213 for maintaining various rules, regulation and standard of service with the business users relating to the applications. The service container 204 also provides Extract Transform Load (ETL) services, Business Process Management (BPM) services, analytics, data access, helpers, etc. The Service Container 204 generates business services using metadata provided by the authoring interface (Enterprise Application Designer 208) and exposes the business services to external applications using different interfaces (SOAP, JSON, REST etc). The Enterprise Application Designer 208 allows business users to build the enterprise application by wiring platform services as business services using rules. The Enterprise Application Designer 208 provides a platform for collaborative development, deployment, monitoring and maintenance of the enterprise application. The business services also provide an associated business user interface (UI) which is configured using the UI templates. These user interfaces are also configurable to run on different client devices having different form factors and to support internationalization. The service container 204 employs one or more I/O adapters for providing the services.

Figure 3:
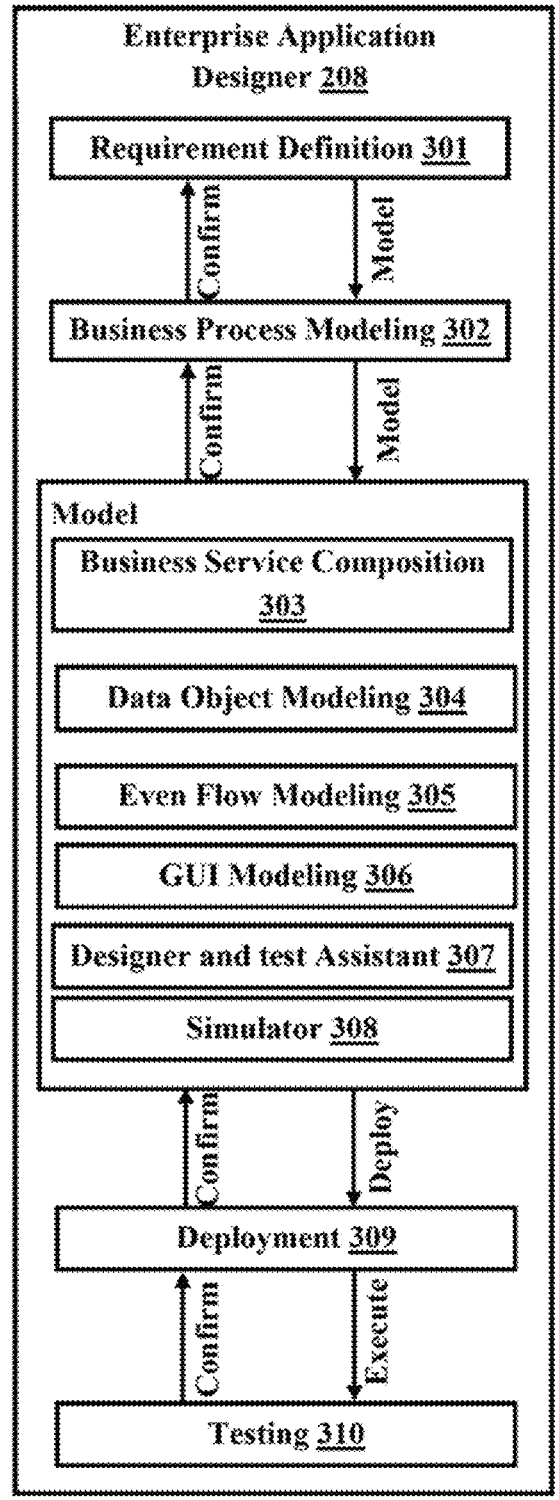
FIG. 3 is a flow diagram illustrating a process of building, deploying and testing an enterprise application on the collaborative business application development platform, according to an embodiment of the present disclosure.

FIG. 3 is a flow diagram illustrating a process of building, deploying and testing an enterprise application on the collaborative business application development platform, according to an embodiment of the present disclosure. The steps involved in building and deploying an enterprise application on the application development platform comprises evoking an Enterprise Application Designer 208. The first step is to capture the requirements for the enterprise application. The captured requirements are then stored in a requirement definition block 301. The Enterprise Application Designer 208 also provides traceability for the captured requirements, so that business users are able to identify all artifacts associated with the requirement. The enterprise application designer 208 also provides the status of each requirement, where the requirement status comprises pending, in progress, testing, completed etc. The overall processes involved in the enterprise application, are then captured and modeled by a business process modeling 302. The overall process includes both manual as well as automated actions. The automated steps in the business process are implemented by a business service composition module 303. The business service composition module 303 composes the business services through wiring platform services with business rules. While composing business services, the business entities and events are also modeled. The data object 304 is modeled for organizing the business related information and representing the information to the business users. Further, an event flow is modeled 305. The GUI is then modeled by using GUI modeling 306 features. Every UI should be associated with an underlying business service. The user selects different UI templates to be used and the corresponding GUI is generated for different client device types and form factors. A designer and test assistant 307 is also provided for executing the generated GUI and reporting any errors. A simulator 308 is provided to test the GUI before deployment. After modeling the business processes and events, the Enterprise Application Designer 208 enables the user to deploy 301 the metadata of the enterprise application onto the application development platform. Once the metadata of the enterprise application is deployed onto the application development platform (309), the business services and the user interface are generated on the application development platform. From the Enterprise Application Designer 208, the deployed application's business services and the corresponding UI is tested (310). End-to-end traceability between the requirements, the configured artifacts, the test cases and the pass/fail status of those test cases is maintained in the Enterprise Application Designer 208.

Here the BPMN modeling, business service composition 303, GUI modeling 306, data object modeling, event flow modeling 305 and other visual modeling editors is provided for authoring enterprise applications.

Figure 4:
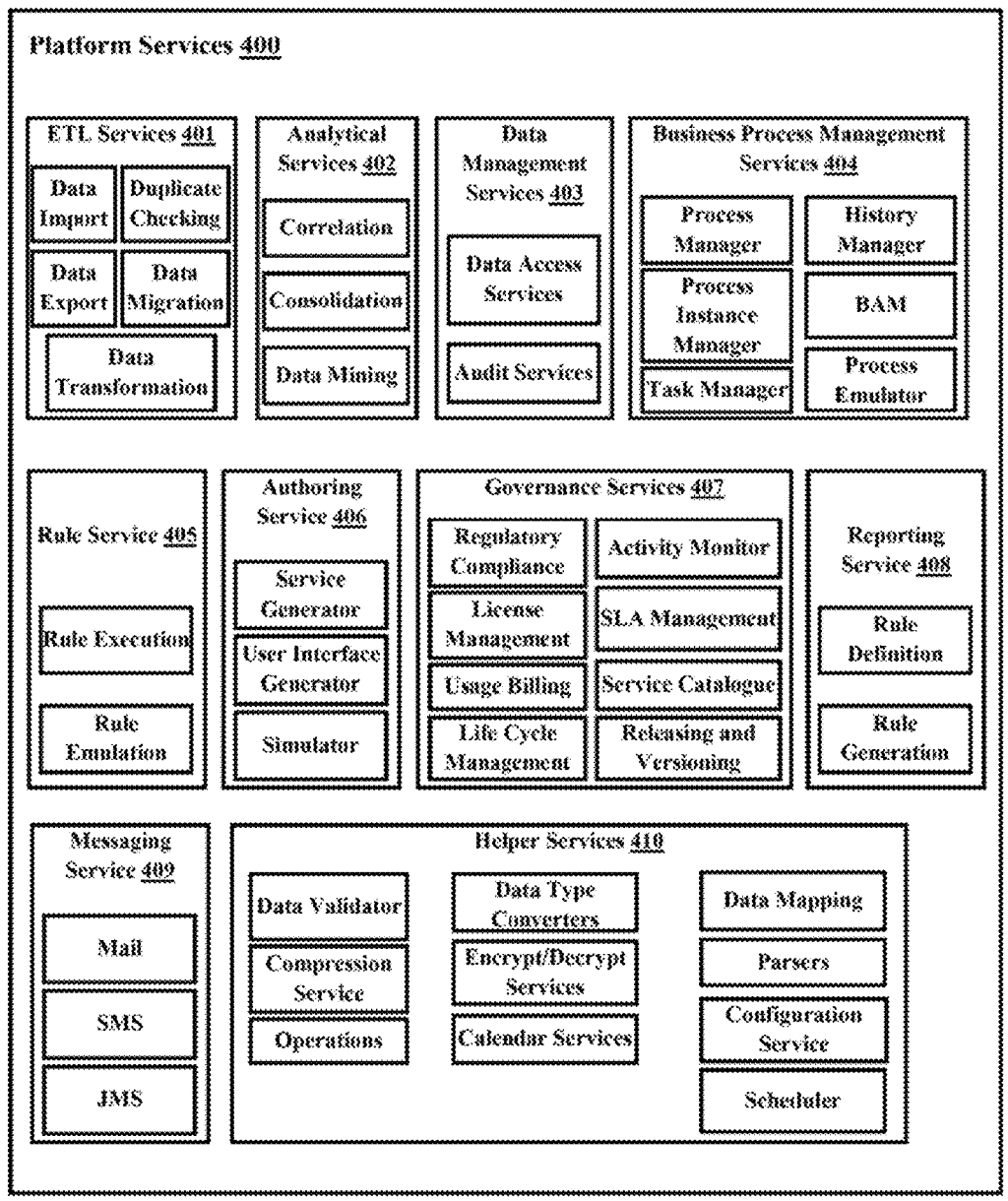
FIG. 4 is a table illustrating a list of platform services to be deployed in the application development platform, according to an embodiment of the present disclosure.

FIG. 4 is a table illustrating a list of platform services to be deployed in the application development platform, according to an embodiment of the present disclosure. The platform services 400 enables the users to build enterprise applications by wiring platform services using rules to create the business services and business processes of the enterprise application. The platform services are highly flexible such that the enterprises can use it to build applications tailored for their specific needs. The Platform services are also configurable. For example, the Data Management platform service can be configured to support different attribute types, business entities and entity relationships.

The plurality of platform services 400 comprises Extract-Transform-Load (ETL) services 401, Analytical services 402, data management services 403, business process management services 404, rule services 405, authoring services 406, governance services 407, reporting services 408, messaging services 409 and helper services 410. The ETL services 401 comprise data import, data export, duplicate checking, data migration and data transformation services. The data import operation imports required and necessary information from the plurality of data sources. The duplicate checking operation checks for redundant information and removes the same for improving the storage and efficiency. The data export provides the requested information to one or more business users. The data migration operation transfers the data between different storage types, formats, or computer systems. The data transformation helps in converting the data to a preferred format for ease of processing and increasing the quality of output.

With respect to FIG. 4, the analytical services 402 comprise operations such as correlation, consolidation, and data mining. The correlation operation enables a business user to measure the closeness of values of two or more variables.

The consolidation operation collects or aggregates the plurality of data in a common platform and then processes for simplicity. The data mining operation searches for patterns in data and corresponding metadata. The data management service 403 provides data access services and auditing services based on inflow of information.

The business process management services 404 enable the enterprise to efficiently handle the plurality of processes involved for a service delivered to a consumer. The business process management services 404 is controlled by a process manager, a history manager, a process instance manager, a BAM, a task manager and a process emulator. The process manager assist in forming a business process comprising planning and monitoring of the activities related to a specific business. The history manager stores a log of all the executed and formulated business processes and facilitates a quick review of the processes as well. The Process Manager stores metadata about all deployed processes in the platform, while the Process Instance Manager stores the execution state of currently executing processes. The Business Activity Monitoring (BAM) monitors the business-specific processes of the system. The Task manager assists in managing individual tasks of a business process. The process emulator runs the business process before deploying in the application development platform or in the user devices.

The ride service 405 handles rule execution and rule emulation for proper functioning of the business services and processes. The authoring service 406 comprises a service generator, a user interface generator and a simulator. The authoring service enables the business user to form and create a preferred specific service in the application development platform. The user interface generator develops a plurality of user interfaces for varied range of user devices such as smart phone, tablet, laptop, etc. The simulator provides a means to check the business process and the user interface as per the designed operation.

The governance service 407 provides a facility of controlling the business processes and business services. The governance services 407 comprises regulatory compliance, license management, usage billing, life cycle management, activity monitor, SLA management, service catalogue, and not limited to releasing and versioning. The reporting service 408 helps in generating and managing reports of an enterprise for a preferred business process or service. The reporting service 408 provides report for rule definitions and rule generation. The messaging service 409 provides notifications through E-mail, SMSs and JMSs.

The helper services 410 provides assistance to plurality of business users by providing services comprising a data validator, a data type converters, a data mapping, a compression service, an encrypt/decrypt service, parsers, operations, calendar services, configuration service, scheduler etc. The data validator verifies the data with respect to correctness, meaning, values, importance etc stored in the platform for processing. The data type converters transform a data to another format for ease of processing. The data mapping matches the data stored in the cloud with different data models. The compression service reduces the size of the data stored in the cloud, and increases the storing capacity of the cloud. The encrypt/decrypt services encodes the information by specific algorithm to an unreadable form and similarly, the decrypt services decodes the encoded information to readable form when required. The parsers syntactically analyze the information stored in the cloud and derive meaning full outputs for further usage. The operation helps the business user in understanding the different services performed in the cloud. Here the operation is at least one of a mathematical operation, for instance, sum, average or any commonly used operations. The calendar services arrange the task of the business user in orderly manner and displays using interactive interfaces for prompt usage. The configuration service arranges the different modules required to am the request of a business user. The scheduler plans the sequence of the services to be executed to optimize the working and loading conditions of the application development platform.

Figure 5:
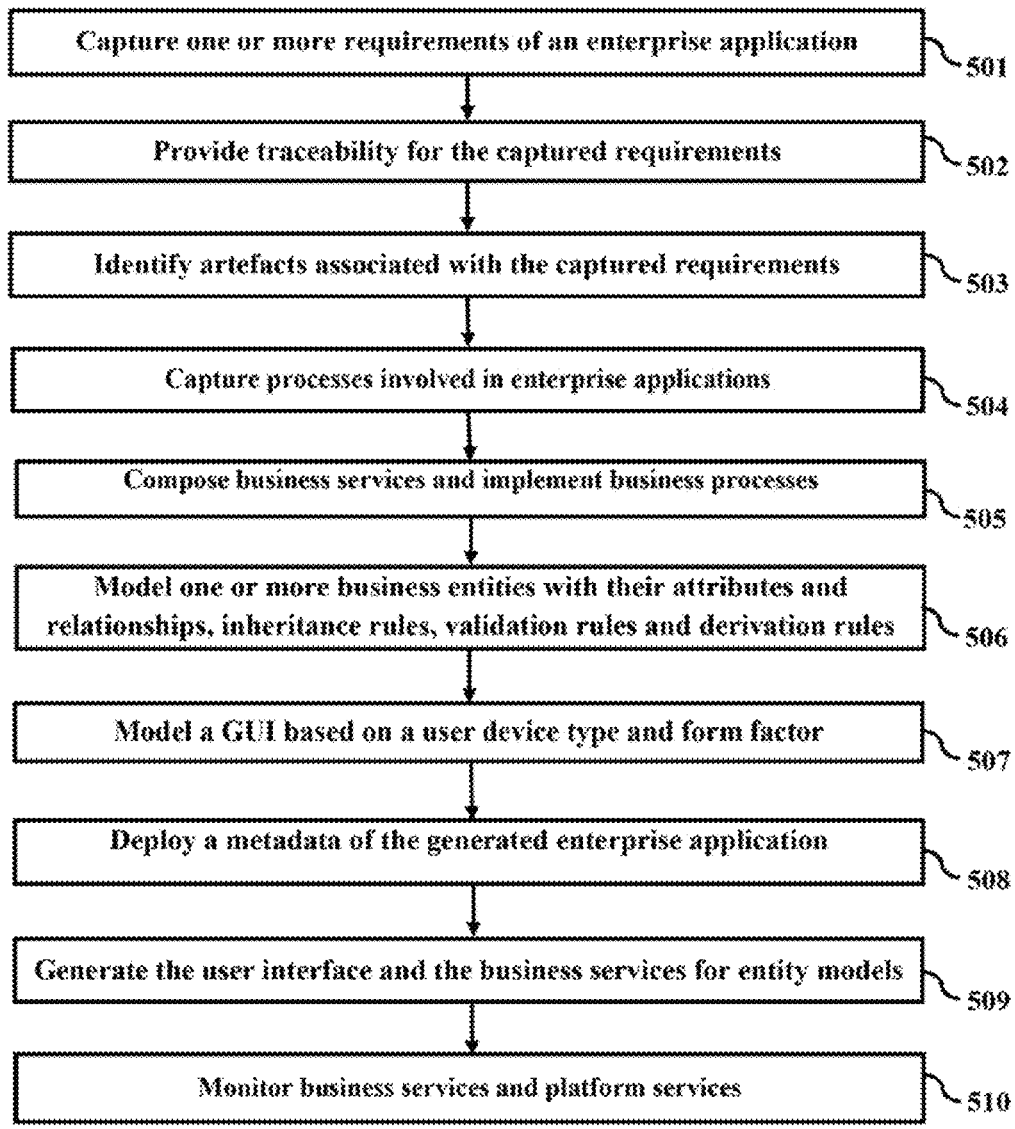
FIG. 5 is a flow chart illustrating a method for collaborative designing development, deployment, execution, monitoring and maintenance of an enterprise application in the cloud based platform, according to an embodiment of the present disclosure.

FIG. 5 is a flow chart illustrating a method for collaborative designing development, deployment, execution, monitoring and maintenance of an enterprise application in the cloud based platform, according to an embodiment of the present disclosure. The method comprises capturing one or more requirements for the enterprise application such as but not limited to reliability, efficient, interactive and easy to learn interfaces, etc (501). The enterprise application designer provides traceability for the captured requirements for improving the performance whenever required (502). The traceability also allows the business users to identity all the artifacts associated with each of the captured requirement (503). The status such as pending, in progress, testing, completed etc of each requirement is also known. Further, one or more processes involved in the enterprise application are captured (504). These processes include both manual as well as automated actions. Then one or more business processes are implemented by composing business services through wiring a plurality of platform services with business rules (505). While composing business services, the necessary business entities and events are modeled. Further, one or more business entities and one or more events related to the business entities with their attributes and relationships, inheritance rules, validation rules and derivation rules are modeled (506). Further, a graphical user interface (GUI) is modeled based on a user device type and form factor (507). Every user interface is associated with an underlying business service. The user is able to select different user interface templates to be used and the corresponding GUI is generated for different client device types and form factors. A simulator is provided to test the GUI before deployment. The enterprise application designer also enables the user to deploy the metadata of the enterprise application onto the application development platform or the like (508). Once the metadata of the enterprise application is deployed onto the application development platform, the business services and the user interface are generated on the application development platform (509). Finally, the deployed applications in the application development platform are monitored for errors and warnings (510). The plurality of information on performance of a plurality of platform services and business services is obtained. The monitoring is further followed by informing the users on the expected performance of business services and refining execution logic of the deployed business services to enhance performance of the business services According to an embodiment herein, the business users are able to build enterprise applications by wiring the exposed platform services using business rules. An Enterprise Application Designer is adopted for collaborative development, deployment, execution and maintenance of Enterprise applications on the application development platform either on a public cloud or private set-up such as a hardware appliance which is hosted within an enterprise.

According to an embodiment herein, the Enterprise Application Designer allows plurality of business users to author enterprise applications using BPMN and other visual modeling editors. The Business UI is configured and bundled with every business service such that each service is able to expose itself via configurable business UI. Further, each business service also provides sub-services for testing respective functionality and performance.

According to an embodiment herein, the application development platform also comprises a service container in which both platform services as well as business services are deployed and managed. The business service is authored by the user by wiring platform services with rules.

According to an embodiment herein, the application development platform and the corresponding platform services are highly flexible so that enterprises are able to build applications tailored to their specific needs. The platform services are also configurable i.e. the Data Management platform service are configured to support different attribute types, business entities and entity relationships.

According to an embodiment herein, the enterprise applications built on top of the application development platform are flexible, so that when the underlying business rules of the business application or wiring mechanism are changed, the deployed enterprise application immediately reflects those changes. The authoring of the application is based only on business rules, platform services and their relationship.

According to an embodiment herein, the cloud-managed applications are always available with zero downtime to support enterprise users. The maintenance of the applications is easy, and hardware upgrades are supported instantly.

According to an embodiment herein, the application development platform is tailored to be linearly scalable, so that as the available hardware is increased, there is a corresponding linear improvement in the performance. The scalability allows enterprise applications deployed on the application development platform to support mil lions of transactions per second.

According to an embodiment herein, an Application Knowledge Base is provided which holds the knowledge related to building business entities, attributes, relationships and the associated processing rules. The Application Knowledge Base is used to enhance the speed of the application development by assisting the application builder in providing standard application templates for various industries, pre-defined entities for various applications with pre-defined attributes, rules etc. As the application is modified and changed by the users, the changes are tracked and new options for future developers based on statistical modeling and Artificial Intelligence techniques are provided. The Application Knowledge base also holds information about the performance benchmarks of various platform services and basic rule engine operations. As business services are wired using platform services and rules, the Enterprise Application Designer informs the user about the expected performance of the business services. This information is used by the designer to wire the business services in an optimal way, keeping performance considerations to the priority.

According to an embodiment herein, the application development platform comprises an Execution Experience Knowledge Base to track statistics on the performance of various services, all critical runtime parameters etc. An administrator is informed about any chances of potential issues that may occur in the future so that such issues are prevented. The application development platform also uses the runtime monitoring information to refine the execution logic of the deployed business services to enhance their performance.

According to an embodiment herein. Execution Experience knowledge is added to the Application Knowledge base to improve the performance. The information about the actual performance of the platform is made available during authoring, so that the business users are able to wire business services while keeping performance considerations as priority.

According to an embodiment herein, the application development platform is provided as a hardware appliance which is hosted within the enterprise. The horizontal scalability of the hardware appliance is achieved by adding more nodes to the appliance. As the functionality of the services gets established on a progressive basis, the programming logic of the application development platform is converted into hardware components such as Application Specific Integrated Circuits (ASICs) for better scalability. This is performed by converting the business logic into Hardware Definition Languages and burning them into FPGAs (Field Programmable Gate Arrays).

According to an embodiment herein, the application development platform allows the user to configure the flexibility, scalability and functionality aspects of the generated application depending on the needs of a particular business at the correct level for an enterprise product or an enterprise solution. For example, an enterprise product have more functionality and reduced scalability, while in an enterprise solution, the functionality is reduced to only satisfy the solution's requirements while scalability is improved.

According to an embodiment herein. The enterprise application is an application software which comprises one or more units of functionality such as a web portal with E-Mail functionality, database programs, word processing programs, accounting programs, inventory management programs, numerical analysis programs, etc. The application also comprises services containing logical unit of functionality such as an autonomous unit that is responsible for a transformation, storage and/or retrieval of data, such as a database management service or a database API service.

According to an embodiment herein, the enterprise application development platform facilitates a plurality of services and functionalities to a user. The enterprise application development platform is flexible so that when the underlying business rules of the business application or their wiring mechanism are changed, the deployed enterprise application should immediately reflect those changes. Also, the platform supports linear scalability, high availability, fault tolerance and consumes less energy. A non-technical (business) user is able to build, deploy and maintain enterprise applications. The enterprise application development platform enables to build tailor made applications according to user needs. The user interface enables a user to access the integrated development environment and the cloud manager over the network, specifically the Internet. An end-to-end support and traceability for the entire application lifecycle is provided along with supporting various types of data stores. The platform maintains history of performance of different platform services, notifies users on existence of any factors affecting the performance of the application and improves operational performance of the enterprise applications.

According to an embodiment herein, an enterprise application is automatically created by the enterprise application development platform once the application requirements from a functional and non-functional point of view are modeled by wiring basic platform services with business rules.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A computer implemented system for enabling collaborative designing, development deployment, execution, monitoring and maintenance of an enterprise application simultaneously executed on a plurality of nodes, the system comprising:
    a distributed cache shared across said plurality of nodes;
    a load balancer configured to distribute tasks amongst said plurality of nodes;
    a cluster manager cooperating with said load balancer, said cluster manager configured to implement one or more clustering strategies, said cluster manager further configured to selectively activate and deactivate at least one of said plurality' of nodes, based on the tasks assigned to said plurality of nodes;
    wherein the cluster manager is further adapted to provide for energy conservation by switching OFF one or more hardware nodes during off peak hours with minimal load and switching ON the hardware nodes when the load increases;
    a data access layer to connect to a plurality of data stores using one or more persistent store adaptors, said data access layer configured to cache a plurality of application program interfaces corresponding to said enterprise application;
    a data management layer to provide access to business data corresponding to said enterprise application and meta-data associated with said business data;
    a processor configured to support Online Transaction Processing (OLTP), said processor configured to link business rules with corresponding invocation chains and object rules, said processor configured to invoke said invocation chains and object rules based on said business rules being triggered;
    a service container for generating business services by wiring platform services with business rules; and
    an application knowledge base adapted to:
        store knowledge related to building business entities, attributes related to the entities, relationship between entities and associated processing rules;
        track performance of business and platform services in production;
        maintain history of expected performance of different platform services; and
        hold information on performance benchmarks of various platform services and rale engine operations; wherein the performance benchmark information is adapted for:
            predicting the expected performance of platform services by adding up the performance of one or more platform services; and
            notifying administrators if the actual performance of the platform services in the production system is different from the excepted performance.

2. The system of claim 1, wherein the business applications are built based on the business rules, the platform services and the relationship between the platform services and the business rules.

3. The system of claim 1, wherein the enterprise application designer builds enterprise applications through at least one of Business Process Model and Notation (BPMM), service composition, GUI modeling, data entity modeling and other visual modeling editors.

* * * * *